United States Patent
Lim (10) Patent No.: US 9,619,025 B2
(45) Date of Patent: Apr. 11, 2017

(54) METHOD AND SYSTEM FOR OPERATING A MOBILE DEVICE ACCORDING TO THE RATE OF CHANGE OF THE TOUCH AREA

(75) Inventor: Byoung Hyun Lim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 565 days.

(21) Appl. No.: 12/954,730

(22) Filed: Nov. 26, 2010

(65) Prior Publication Data

US 2011/0134061 A1 Jun. 9, 2011

(30) Foreign Application Priority Data

Dec. 8, 2009 (KR) .................. 10-2009-0121189

(51) Int. Cl.
G06F 3/01 (2006.01)
G06F 3/041 (2006.01)
G06F 3/0488 (2013.01)

(52) U.S. Cl.
CPC ............ *G06F 3/016* (2013.01); *G06F 3/0416* (2013.01); *G06F 3/04883* (2013.01)

(58) Field of Classification Search
USPC .............................. 345/173, 168; 455/73, 95
See application file for complete search history.

(56) References Cited

U.S. PATENT DOCUMENTS

| | | | |
|---|---|---|---|
| 5,619,003 A * | 4/1997 | Hotz ............................... 84/615 |
| 6,972,363 B2 * | 12/2005 | Georges et al. ................ 84/609 |
| 7,129,405 B2 * | 10/2006 | Moffatt et al. .................. 84/600 |
| 7,723,603 B2 * | 5/2010 | Moffatt ........................... 84/610 |
| 7,786,366 B2 * | 8/2010 | Moffatt ........................... 84/600 |
| 7,829,778 B2 * | 11/2010 | Gatzsche et al. ............... 84/615 |
| 8,003,875 B2 * | 8/2011 | Wang et al. ..................... 84/615 |
| 8,212,780 B2 * | 7/2012 | Mashimo ...................... 345/173 |
| 8,242,344 B2 * | 8/2012 | Moffatt ........................... 84/609 |
| 8,363,020 B2 * | 1/2013 | Li et al. ......................... 345/173 |
| 8,462,128 B2 * | 6/2013 | Choi ............................. 345/173 |
| 8,516,386 B2 * | 8/2013 | Adam et al. ................... 715/773 |
| 8,537,119 B1 * | 9/2013 | Grivna et al. ................ 345/169 |
| 9,170,649 B2 * | 10/2015 | Ronkainen ............. G06F 3/016 |
| 2001/0015123 A1 * | 8/2001 | Nishitani et al. ............... 84/615 |
| 2004/0137984 A1 * | 7/2004 | Salter ............................. 463/35 |
| 2006/0005692 A1 * | 1/2006 | Moffatt .......................... 84/645 |
| 2006/0050062 A1 | 3/2006 | Ozawa et al. |
| 2006/0066589 A1 | 3/2006 | Ozawa et al. |

(Continued)

FOREIGN PATENT DOCUMENTS

CN 101112074 A 1/2008
CN 101465121 A 6/2009

(Continued)

*Primary Examiner* — Lun-Yi Lao
*Assistant Examiner* — Kelly B Hegarty
(74) *Attorney, Agent, or Firm* — Jefferson IP Law, LLP (57) ABSTRACT

A method and system for operating a mobile device according to a rate of change of a touch area are provided. The system includes a touch screen for creating a touch event according to a touch and a controller. The controller detects the rate of change of the touch area, according to information of a location where the touch event occurred and the occurrence of the touch event. The controller performs a function linked to the touch event detected location, by varying a property of the function according to the rate of change of the touch area.

15 Claims, 7 Drawing Sheets

(56) References Cited

U.S. PATENT DOCUMENTS

| | | | |
|---|---|---|---|
| 2006/0066590 A1 | 3/2006 | Ozawa et al. | |
| 2006/0238495 A1* | 10/2006 | Davis | 345/156 |
| 2007/0152975 A1 | 7/2007 | Ogihara et al. | |
| 2007/0152976 A1* | 7/2007 | Townsend et al. | 345/173 |
| 2008/0172633 A1* | 7/2008 | Jeon et al. | 715/810 |
| 2008/0204427 A1* | 8/2008 | Heesemans et al. | 345/174 |
| 2008/0252616 A1* | 10/2008 | Chen | 345/173 |
| 2008/0254824 A1 | 10/2008 | Moraes | |
| 2008/0307945 A1* | 12/2008 | Gatzsche et al. | 84/477 R |
| 2009/0051667 A1* | 2/2009 | Park | G06F 3/016 345/173 |
| 2009/0153519 A1* | 6/2009 | Suarez Rovere | 345/173 |
| 2009/0173216 A1* | 7/2009 | Gatzsche et al. | 84/613 |
| 2009/0227295 A1* | 9/2009 | Kim | 455/566 |
| 2009/0227296 A1* | 9/2009 | Kim | 455/566 |
| 2009/0237374 A1* | 9/2009 | Li et al. | 345/174 |
| 2009/0315836 A1* | 12/2009 | Pihlaja | 345/173 |
| 2009/0322498 A1* | 12/2009 | Yun et al. | 340/407.2 |
| 2010/0026647 A1* | 2/2010 | Abe et al. | 345/173 |
| 2010/0053105 A1* | 3/2010 | Choi | 345/173 |
| 2010/0053107 A1* | 3/2010 | Tsuzaki et al. | 345/173 |
| 2010/0057235 A1* | 3/2010 | Wang et al. | 700/94 |
| 2010/0137026 A1* | 6/2010 | Kim et al. | 455/556.1 |
| 2010/0287471 A1* | 11/2010 | Nam et al. | 715/702 |
| 2010/0294112 A1 | 11/2010 | Asakura et al. | |
| 2010/0321312 A1* | 12/2010 | Han et al. | 345/173 |
| 2011/0021272 A1* | 1/2011 | Grant et al. | 463/30 |
| 2011/0050394 A1* | 3/2011 | Zhang et al. | 340/5.82 |
| 2011/0050576 A1* | 3/2011 | Forutanpour et al. | 345/168 |
| 2011/0050588 A1* | 3/2011 | Li et al. | 345/173 |
| 2011/0063248 A1* | 3/2011 | Yoon | 345/174 |
| 2011/0199312 A1* | 8/2011 | Okuta | 345/173 |
| 2011/0227877 A1* | 9/2011 | Chen | 345/175 |
| 2011/0271193 A1* | 11/2011 | Wang et al. | 715/727 |
| 2012/0001861 A1* | 1/2012 | Townsend et al. | 345/173 |
| 2012/0071994 A1* | 3/2012 | Lengeling | 700/94 |
| 2012/0254751 A1* | 10/2012 | Kim | 715/716 |
| 2013/0044070 A1* | 2/2013 | Townsend et al. | 345/173 |

FOREIGN PATENT DOCUMENTS

| | | |
|---|---|---|
| CN | 101506870 A | 8/2009 |
| JP | 2006-085687 A | 3/2006 |
| JP | 2006-127486 A | 5/2006 |
| JP | 2006-127488 A | 5/2006 |
| JP | 2009-098483 A | 5/2009 |
| KR | 10-2009-0111943 A | 10/2009 |

* cited by examiner

METHOD AND SYSTEM FOR OPERATING A MOBILE DEVICE ACCORDING TO THE RATE OF CHANGE OF THE TOUCH AREA

PRIORITY

This application claims the benefit under 35 U.S.C. §119(a) of a Korean patent application filed on Dec. 8, 2009 in the Korean Intellectual Property Office and assigned Ser. No. 10-2009-0121189, the entire disclosure of which is hereby incorporated by reference.

BACKGROUND OF THE INVENTION

1. Field of the Invention

This invention relates to a method and system for operating a mobile device. More particularly, the present invention relates to a method and system for varying a property of a particular function of a mobile device with a touch panel, according to a rate of change of a touch area of the mobile device.

2. Description of the Related Art

Mobile devices are widely used because they can be transported easily and support a variety of user functions. The mobile devices employ various types of input modes to provide user functions. For example, the mobile devices are equipped with a mechanical keypad installed to one side and allow users to input letters or numbers. For the sake of portability, mobile devices are restricted in their size. Since the mobile devices are small in size, their display unit needs to make use of available space. As a result, a keypad is omitted from the mobile devices, and instead a touch screen including a touch panel is installed in the mobile devices, serving as the display and input unit.

When various types of touch tools touch the touch screen, the mobile devices create corresponding touch events and thus serve as an input device as well as a display. However, when conventional mobile devices display a particular key map on the display unit and a touch is made on a corresponding key, the mobile devices create a signal corresponding to the touched key. That is, conventional mobile devices are disadvantageous in that they cannot create a variety of input signals based on the touch screen.

Therefore, a need exists for a method and system for performing a variety of functions on a touch screen of a mobile device.

SUMMARY OF THE INVENTION

An aspect of the present invention is to address at least the above-mentioned problems and/or disadvantages and to provide at least the advantages described below. Accordingly, an aspect of the present invention is to provide a method and system for allowing a mobile device to perform a variety of functions according to a rate of change of a touch area of the mobile device.

In accordance with an aspect of the present invention, a method for operating a mobile device according to a rate of change of a touch area is provided. The method includes detecting a location where a touch event occurs, detecting the rate of change of the touch area at the touch event detected location, and performing a function linked to the touch event detected location, by varying a property of the function according to the rate of change of the touch area.

In accordance with another aspect of the present invention, a system for operating a mobile device according to the rate of change of the touch area is provided. The system includes a touch screen for creating a touch event according to a touch and a controller. The controller detects the rate of change of the touch area, according to information of a location where the touch event occurred and the occurrence of the touch event. The controller performs a function linked to the touch event detected location, by varying a property of the function according to the rate of change of the touch area.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, although exemplary embodiments of the present invention are described based on a mobile device, it should be understood that the present invention is not limited thereto. For example, various types of mobile devices with a touch panel may also be applied.

Figure 1:
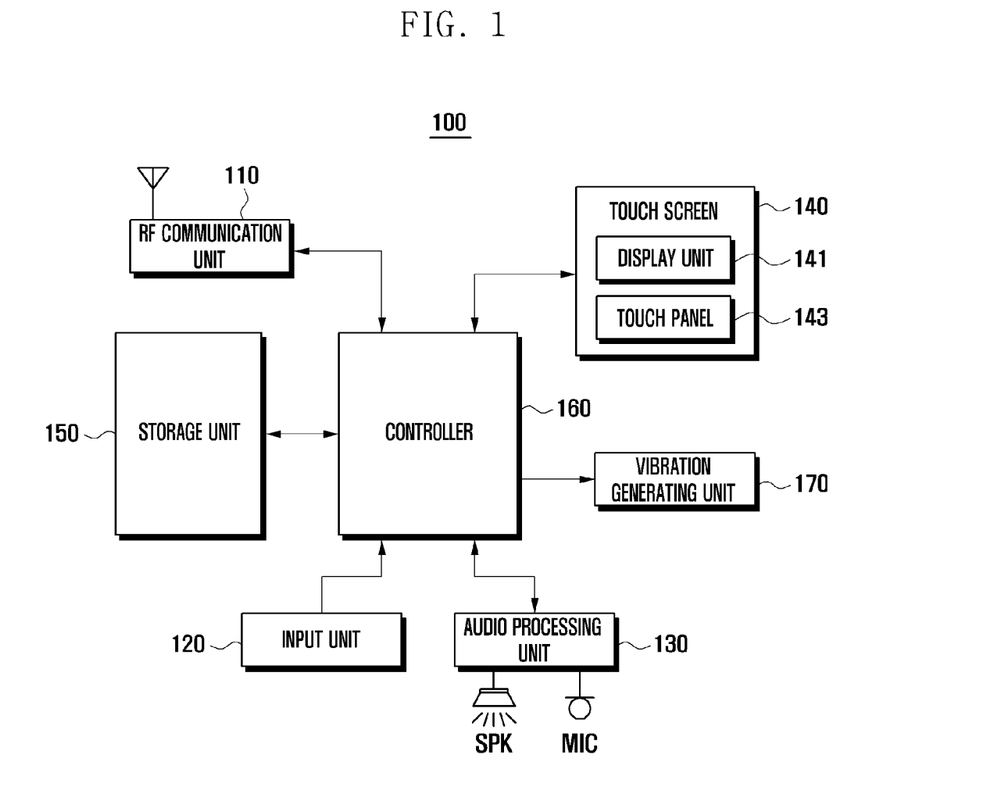
FIG. 1 is a schematic block diagram illustrating a configuration of a mobile device according to an exemplary embodiment of the invention.

FIG. 1 is a schematic block diagram illustrating a configuration of a mobile device according to an exemplary embodiment of the present invention.

Referring to FIG. 1, the mobile device 100 includes a Radio Frequency (RF) communication unit 110, an input unit 120, an audio processing unit 130, a touch screen 140, a storage unit 150, a vibration generating unit 170, and a controller 160.

The mobile device 100 detects a rate of change of a touch area with respect to a touch event that occurs on a touch panel 143 of the touch screen 140 and alters a property of a function corresponding to the touch event according to the rate of change of the touch area. Each component included in the mobile device 100 is described in detail below.

The RF communication unit 110 establishes communication channels with other mobile devices so that the mobile device may make a voice call and transmit and receive data, such as images, videos, and the like, under the control of the controller 160. Examples of the communication channels may include a voice call, a video call, and data communication. To this end, the RF communication unit 110 includes an RF transmitter for up-converting the frequency of signals to be transmitted and amplifying the signals and an RF receiver for low-noise amplifying received RF signals and down-converting the frequency of the received RF signals. The mobile device 100 may display information, such as a phone book, and the like, on the display unit 141 in order to operate the RF communication unit 110. The RF communication unit 110 may be omitted if the mobile device 100 does not support a mobile communication function. In order to operate the RF communication unit 110, the mobile device user may select another mobile device user's information stored in the phone book or may input a number corresponding to the other mobile device user's information. When the mobile device 100 is equipped with a touch screen 140, instead of a key button or a keypad, it may display a key map containing numbers on the touch screen 140. The key map may be implemented with a 3×4 key arrangement, a 4×3 key arrangement, a QWERTY key arrangement, and the like.

The input unit 120 includes a number of input keys that allow a user to input numerical or alphabetical information. The input unit 120 also includes a number of function keys to which a variety of functions are assigned. The function keys may be direction keys, side keys, shortcut keys, and the like, which are set to perform specific functions. When a full touch screen is installed to the mobile device 100, it may serve as the input unit 120. In this case, side keys are further installed to one side of the case of the mobile device 100 and also serve as the mobile device 100 together with the touch screen. When the mobile device 100 employs a touch screen 140, the input unit 120 is implemented with a key map comprised of a number of keys, set in the touch panel 143. The key map may be implemented with a 3×4 key arrangement, a 4×3 key arrangement, a QWERTY key arrangement, a menu arrangement, a soft key arrangement, and the like.

The audio processing unit 130 reproduces audio data via a speaker (SPK). The audio data refers to data transmitted or received during the call, contained in a received message, or stored in the storage unit 150. The audio processing unit 130 also receives audio signals, for example, a user's voice during the call, or other audio sounds, via a Microphone (MIC). The audio processing unit 130 may output audio sounds of various types of musical instruments via the SPK. For example, the audio processing unit 130 may output musical instrument sounds corresponding to a variety of musical instruments, such as a drum, a pipe, a piano, a guitar, and the like, according to touch events. The audio processing unit 130 may output the audio sounds, varying their sound properties, such as intensity, tone, and the like, according to a rate of change of the touch area when a touch event occurs.

The touch screen 140 includes a display unit 141 and a touch panel 143, where the touch panel 143 is installed to the front of the display unit 141. The size of the touch screen 140 is determined by the touch panel 143. The touch screen 140 may be implemented with a type of full touch screen that covers the display unit 141.

The display unit 141 displays menus of the mobile device 100 and information that is input by the user or provided to the user. The display unit 141 displays various screens as the mobile device 100 is operated, for example, an idle screen, a menu screen, a message writing screen, a call screen, and the like. The display unit 141 may be implemented with a Liquid Crystal Display (LCD), an Organic Light Emitting Diode (OLED), and the like. When the display unit 141 is implemented with a touch screen, it may also serve as an input mechanism, i.e., the input unit 120. In an exemplary implementation, the display unit 141 may also display a user interface containing images corresponding to various types of musical instruments. The user interface is described in detail below with reference to FIG. 3.

The touch panel 143 is placed on the display unit 141. The touch panel 143 allows a user to touch an area under which an image or an item is displayed on the display unit 141 and thus creates a touch event. For example, when the touch panel 143 sets an effective touch area of a musical instrument image displayed on the display unit 141 and creates a touch event on an effective touch area according to a user's touch, the touch panel 143 outputs the touch event to the controller 160. The touch area for a musical instrument image on the touch panel 143 is set according to a certain size range, which will be described in more detail below.

The vibration generating unit 170 outputs various types of vibrations under the control of the controller 160. The vibration generating unit 170 includes at least one vibration motor. The vibration generating unit 170 may be activated in a manner mode when the mobile device 100 receives a call. The vibration generating unit 170 may also be activated when an alarm time arrives. In an exemplary implementation, when the mobile device user plays a musical instrument in a music performance mode of the mobile device 100 and touches the touch panel 143, the vibration generating unit 170 may output a vibration corresponding to a type of vibration pattern according to a touch event created on the touch panel 143. That is, the vibration generating unit 170 may output vibrations corresponding to various types of vibration patterns according to the rate of change of the touch area that varies as the touch event occurs.

The storage unit 150 stores application programs required to operate the functions according to an exemplary embodiment of the present invention. The storage unit 150 also stores a key map for operating the touch screen 140. The key map may be implemented with various types of key maps, for example, a menu map, a soft key map, and the like. For example, the key map may be a keyboard map, a 3×4 key map, a QWERTY key map, and the like. The key map may also be a control key map for controlling an application program that is currently enabled. The menu map may serve to control an application program that is currently enabled. The menu map may contain a list of various menus for the mobile device 100. The storage unit 150 is comprised of a program storage area and a data storage area.

The program storage area stores an Operating System (OS) for booting the mobile device 100 and operating components included in the mobile device 100. The program storing area also stores application programs for reproducing a variety of files, such as an application program for supporting a voice call function, a web browser function for accessing an Internet server, an application program for audio sources, such as an MP3 file, an application program for reproducing photographs, images, moving images, and the like. In an exemplary implementation, the program storage area stores an application for supporting a musical instrument performance.

The musical instrument performance supporting application contains a number of routines as follows. The routines may include a routine for outputting an image corresponding to a musical instrument on the display unit 141, which is selected via a menu, an input of a preset key signal, or a selection of a signal on a key map, a touch panel setting routine for determining an effective touch area where a touch event occurs when a user touches one of the musical instrument images on the display unit 141, a routine for detecting information regarding a location, where a touch event occurs on the touch panel 143, and the rate of change of the touch area regarding to the touch even, and a routine for varying the property of an audio sound or a vibration, as a function corresponding to the location information regarding the touch event, according to the rate of change of the touch area, and outputting the audio sound or vibration.

The musical instrument performance supporting application provides a setting screen so that the user may set the property, through the setting screen, according to the rate of change of the touch area. The user may set an image of a musical instrument and the audio output or the vibration pattern, according to the rate of change of the touch area corresponding to a touch event, via the setting screen. For example, when the setting screen displays a drum image, as a musical instrument image, and at least a portion of drumhead of the drum image is set as an effective touch area, the user may set the drum sound or the vibration pattern of the drum by adjusting the volume up/down control. The mobile device 100 collects touch events that have occurred repeatedly by a preset number to acquire an average touch event and maps the touch events to at least one of the drum sound and the drum vibration pattern. When the touch events occur, the touch panel 143 may be repeatedly touched with the same force and same speed. The user may map various types of touch events to various types of drum sounds, respectively. Examples of the touch events may include a touch event that occurs as a touch tool touches the touch panel with a force equal to or greater than a certain magnitude or a touch speed equal to or greater than a value, a touch event that occurs as a touch tool touches the touch panel with a force equal to or less than a certain magnitude or a touch speed greater than a certain value, a touch event that occurs as a touch tool touches the touch panel with a force greater than a certain magnitude or a touch speed equal to or less than a certain value, and a touch event that occurs as a touch tool touches the touch panel with a force equal to or less than a certain magnitude or a touch speed equal to or less than a certain value. Such various types of touch events correspond to the rate of change of the touch area regarding the touch panel 143, which will be described in detail below.

The data storage area stores data when the mobile device 100 is operated. For example, the data storage area stores contents and at least one icon, according to phone book information, a widget function, and the like. When the touch screen 140 is configured to include the display unit 141, the data storage area may also store a user's input via the touch screen 140. In an exemplary implementation, the data storage area stores information regarding types of touch events or information regarding the rate of change of the touch area, where the types of touch events are mapped with at least one of a variety of audio signals and vibration patterns, corresponding to musical instruments. That is, the data storage area may store data defining the change of the property of a particular function to be performed according to the rate of change of the touch area, and provides the data to the controller 160 when an application program that supports the particular function is activated. The data storage area may also store modeling information regarding the rate of change of the touch area in order to rapidly sample and detect the rate of change of the touch area corresponding to a touch event.

The controller 160 controls power supplied to the components in the mobile device 100 and initializes the power. After completing the initialization, the controller 160 provides a user interface for playing a musical instrument and outputs at least one of an audio signal and a vibration, according to a selected musical instrument and a touch event. The controller 160 is described in detail below with reference to FIG. 2.

Figure 2:
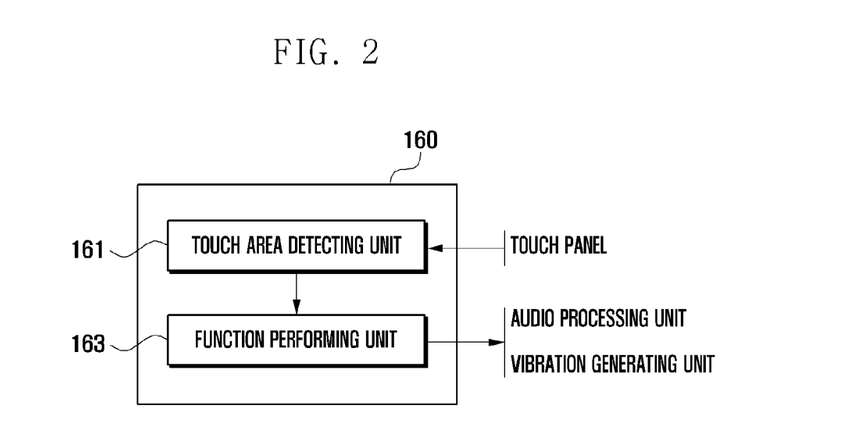
FIG. 2 is a detailed view illustrating a controller of a mobile device according to an exemplary embodiment of the invention.

FIG. 2 is a detailed view illustrating a controller of a mobile device according to an exemplary embodiment of the present invention.

Referring to FIG. 2, the controller 160 includes a touch area detecting unit 161 and a function performing unit 163.

The touch area detecting unit 161 collects touch events that occur on a touch panel 143 of a touch screen 140, together with information locations where the touch event occurred and information regarding the rate of change of the touch areas of the touch events. The touch area detecting unit 161 tracks the rate of change of the touch area and determines whether the tracked rate of change of the touch area is similar to a preset rate of change of a particular touch area, for example, a modeling rate of change of a particular touch area. When the tracked rate of change of the touch area is similar to a modeling rate of change of a particular touch area, the touch area detecting unit 161 outputs modeling information to the function performing unit 163.

The function performing unit 163 performs a function corresponding to the modeling information. For example, the function performing unit 163 activates a menu allowing a user to play a musical instrument. When the user selects a musical instrument, the function performing unit 163 displays an image corresponding to the user's selected musical instrument. The function performing unit 163 sets the touch panel 143 and an effective touch area of the musical instrument image. The function performing unit 163 receives the modeling information, corresponding to a type of touch event that occurs on the effective touch area, and outputs at least one of the audio signal and vibration pattern corresponding to the modeling information. The function performing unit 163 varies the property of the audio signal and the vibration pattern according to the rate of change of the touch area and outputs the varied audio signal and vibration pattern. The operation of the function performing unit 163 is described in detail below.

Figure 3:
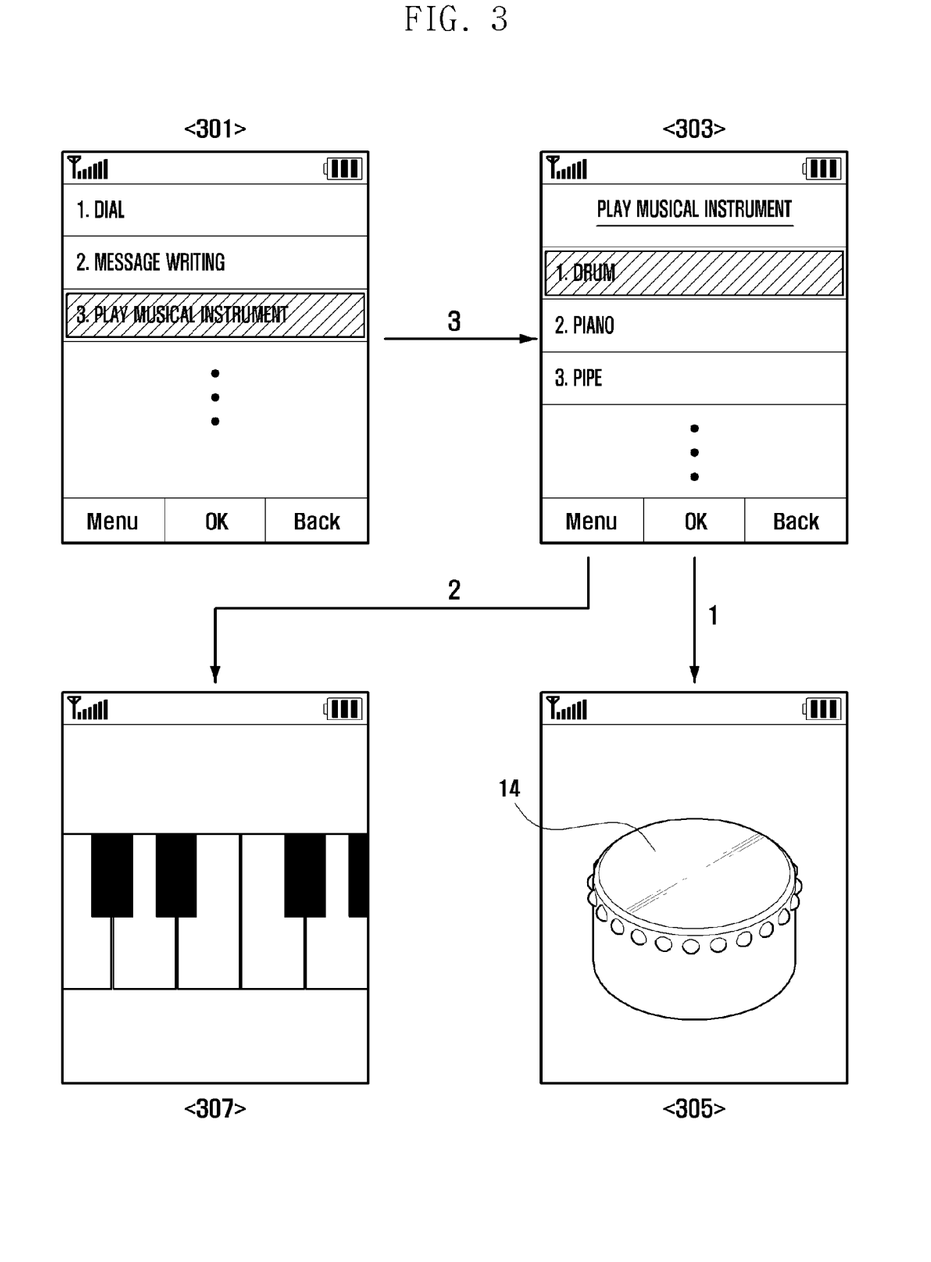
FIG. 3 illustrates user interfaces according to an exemplary embodiment of the invention.

FIG. 3 illustrates user interfaces according to an exemplary embodiment of the invention.

Referring to FIGS. 1 to 3, the mobile device 100 outputs a menu of items containing a 'Play musical instrument' item on the touch screen 140, as illustrated in diagram 301. The user inputs a signal for outputting a menu screen. For example, when the mobile device 100 displays a menu map corresponding to a menu containing a 'Play musical instrument' item, the user creates a touch event to select the item on the touch screen 140. Alternatively, the mobile device 100 may also output the 'Play musical instrument' item on a particular key of the input unit 120 or a particular key map on the touch screen 140, so that the user may activate the particular key or the particular key map, thereby directly selecting the 'Play musical instrument' item.

When the user creates an input signal, for example, a touch event for selecting the item 3, 'Play musical instrument', on the touch screen as illustrated in diagram 301, the mobile device 100 displays the sub-items of the 'Play musical instrument' item on the touch screen 140 as illustrated in diagram 303. For example, the 'Play musical instrument' item has 'Drum', 'Piano' and 'Pipe' as sub-items. It should be understood that the sub-items are not limited to the three listed items. That is, the 'Play musical instrument' item may further contain various types of musical instruments as sub-items provided that the mobile device 100 supports the musical instruments.

When the user inputs a signal to select one of the sub-items, for example, '1. Drum,' on the touch screen 140 as illustrated in diagram 303, the mobile device 100 displays a drum image on the touch screen 140 as illustrated in diagram 305. The mobile device 100 may display the complete image of a drum on the display unit 141. The mobile device 100 may set part of the whole image of a drum, for example, at least a portion of drumhead of the drum, with an effective touch area 14 to create a touch event. That is, the mobile device 100 may set only part of the touch panel 143 as an effective touch area to create a touch event. When the user creates a touch event by touching the effective touch area, the mobile device 100 controls the audio processing unit 130 to output an audio sound corresponding to the drum stroke. Alternatively, the mobile device 100 controls the vibration generating unit 170 to output a vibration pattern corresponding to the drum stoke. The mobile device 100 may vary and output the audio sound and the vibration pattern according to the rate of change of the touch area corresponding to the touch events created by the user. For example, when the user rapidly and firmly strokes the effective touch area 14 and creates corresponding touch events, the mobile device 100 may output at least one of the audio signal and vibration pattern corresponding to the touch events, which are described in detail below with reference to FIGS. 4A to 4G.

Meanwhile, when the user inputs a signal to select a sub-item, '2. Piano' on the touch screen 140 as illustrated in diagram 303, the mobile device 100 displays a piano image on the touch screen 140 as illustrated in diagram 307. The mobile device 100 sets an effective touch area of a piano on the touch panel 143. When a piano is selected, its whole image may be set as an effective touch area on the touch screen 140. In this case, when the user presses a particular region corresponding to one of the keys in the keyboard of the piano, the mobile device 100 detects a pressed key, based on information regarding touched region, and outputs an audio signal corresponding to the pressed key. Alternatively, when a particular key is pressed on the keyboard of the piano, the mobile device 100 may control the vibration generating unit 170 to output a vibration pattern corresponding to the pressed key. The mobile device 100 may vary and output the property of the audio signal and vibration pattern according to the rate of change of the touch area corresponding to a touch event that occurs on the key of the keyboard, as illustrated in diagram 307. That is, when the user slowly and gently touches a key of the piano image on the touch panel 143 and creates a corresponding touch event, the mobile device 100 may vary and output the property of the audio signal or the vibration pattern according to the corresponding touch event, which will be described in detail below with reference to FIGS. 4A to 4E.

FIGS. 4A to 4E are views that describe the rate of change of the touch areas, according to an exemplary embodiment of the invention. The operation of the mobile device 100 is explained with reference to FIG. 3 and FIGS. 4A to 4E.

Referring to FIGS. 4A to 4E, FIG. 4A illustrates a view illustrating the creation of a touch event on a touch screen 140 with a user's finger. Although an exemplary embodiment of the present invention is described in such a way that the user's finger touches the touch screen 140 to create a touch event, it should be understood that the invention is not limited thereto. For example, the touch event may also be created with various types of touch tools, a silicon touch tool, a fabric touch tool, and the like. When the user touches a region in the effective touch area on the touch screen 140 with his/her finger or a touch tool, the touch area may be varied as time elapses. More particularly, a touch area may be varied according to force and speed of a user's finger or a touch tool.

Figure 4A:
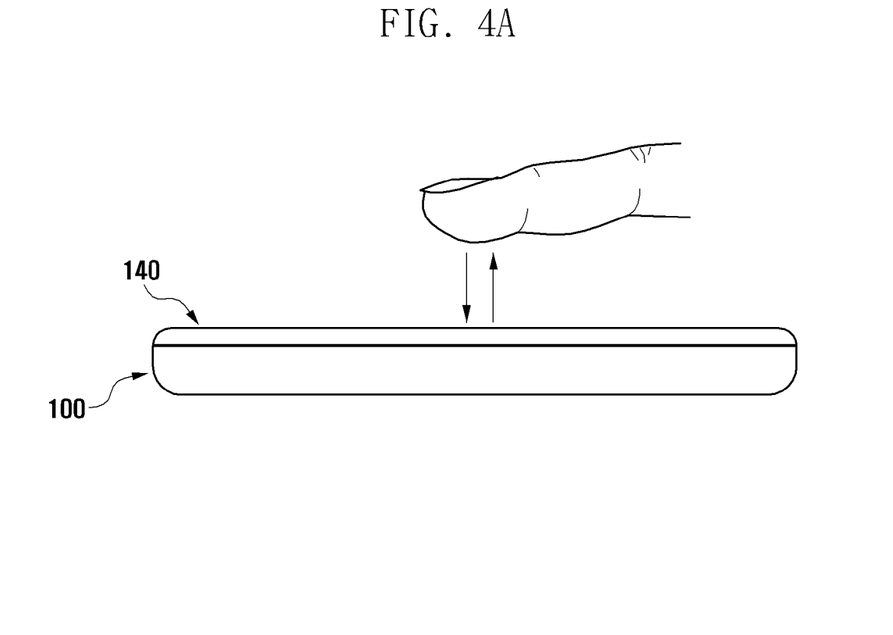
FIGS. 4A to 4E are views illustrating a rate of change of touch areas according to an exemplary embodiment of the invention.
Figure 4B:
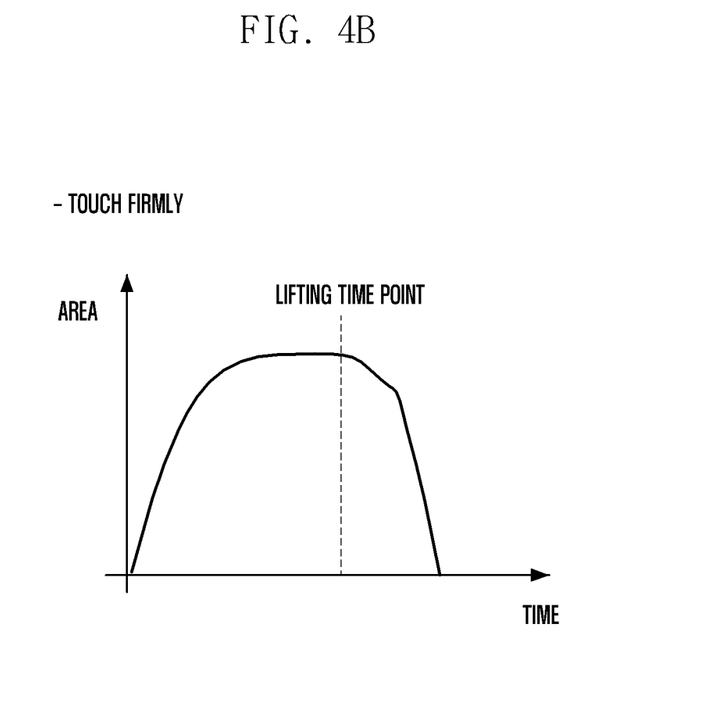

For example, when the user's finger touches the effective touch area with a force equal to or greater than a certain value, such as a strong stroke, the mobile device 100 may detect changes in the increase of the touch area as illustrated in FIG. 4B. If it is assumed that an initial time is defined as a time point immediately before the user's finger touches the touch screen 140 and the initial touch area is defined as an area at the initial time, the mobile device 100 may detect a rapid increase in the touch area after the touching occurs. While the touch is retained on the touch screen 140, the mobile device 100 may detect no change in the touch area. Thereafter, when the user's finger is removed from the touch screen 140, the mobile device 100 detects a rapid decrease in the touch area. That is, when a touch tool, such as the user's finger, and the like, touches the effective touch area, with a relatively large magnitude or at a speed equal to or greater than a certain value, the touch area on the touch screen experiences a rapid increase and decrease within a certain period of time. When the difference of the change between the increase and decrease in the touch area varies widely within a relatively short period of time, the mobile device 100 may detect the change in the touch area. In this case, the mobile device 100 may output an audio signal and vibration pattern corresponding to the rate of change of the touch area. For example, when the user touches an effective touch area of a drum on the touch screen 140, with a touch tool, as illustrated in diagram 305 of FIG. 3, so that the touch area may be varied as a plot illustrated in FIG. 4B, the mobile device 100 may output an audio signal or a vibration pattern corresponding to the change in the touch area. This output may correspond to a case where the user strongly strokes the drum. The mobile device 100 may have stored an audio signal corresponding to the drum sound and information regarding the property of an audio signal, i.e., the change in the magnitude of audio signal, according to the rate of change of the touch area.

Figure 4C:
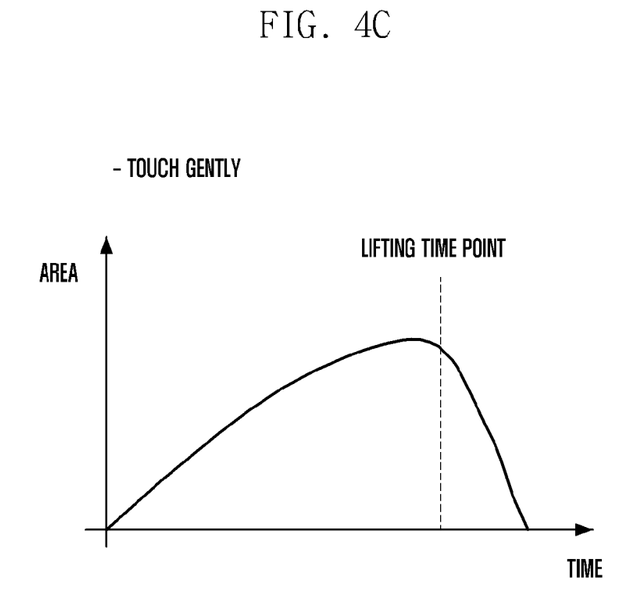

FIG. 4C illustrates a plot illustrating the rate of change of the touch area when a touch tool gently touches the touch screen 140. To "gently stroke" refers to a case where the touch tool touches the touch screen 140 with a force equal to or less than a preset magnitude or a speed equal to or less than a preset value. The plot of FIG. 4C provides information regarding the material the touch tool is made of and the type of touch tool. That is, the touch tool is made of an elastic material and shaped as a sphere. When this tool touches the touch screen 140 with a force or speed, equal to or less than a preset value, it applies its spherical side to the touch screen 140 according to the force or speed and increases the area being touched to the touch screen 140. In this case, the mobile device 100 detects that the touch area is gradually increased, as the front part of the plot illustrated in FIG. 4C, until the force or speed being applied to the touch tool is increased to equal to or less than a preset value.

Thereafter, when the user lifts his/her hand from the touch screen 140 within a certain period of time, i.e., the touch tool is removed from the touch screen 140, the mobile device 100 may detect the rapid decrease in the touch area, illustrated by the later part of the plot illustrated in FIG. 4C. Therefore, when the user performs a gentle touch gesture on the touch screen 140, the mobile device 100 detects a smooth increase in the touch area when the slow touch gesture is being applied to the touch screen 140 within a certain period of time and a rapid decrease while the slow touch gesture is being removed within a period of time. For example, when the user gently touches the touch screen 140 during the drum performance as illustrated in diagram 305 of FIG. 3, the mobile device 100 varies the property of a drum audio signal and outputs a drum sound, which is similar to a drum sound as if a slow stroke is applied to an actual drum.

Figure 4D:
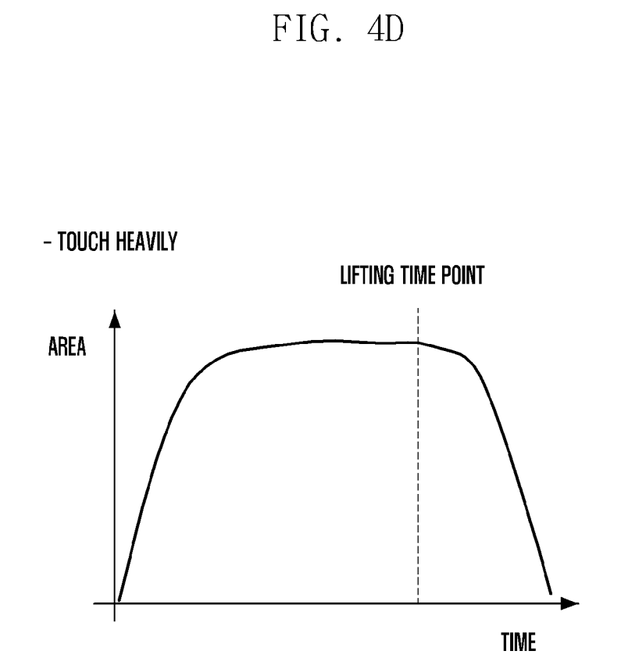

FIG. 4D illustrates a plot illustrating the rate of change of the touch area when a touch tool heavily touches the touch screen 140. The mobile device 100 may detect a rapid increase in the touch area within a certain period of time, as the front part of the plot illustrated in FIG. 4D, no-change in the touch area with a relatively long period of time as the middle part, and a rapid decrease in the touch area within a period of time. Therefore, when a touch tool heavily touches the touch screen 140, the mobile device 100 outputs an audio signal, assigned to the position where the touch event occurs, which is similar to a drum sound as if a heavy stroke is applied to an actual drum.

Figure 4E:
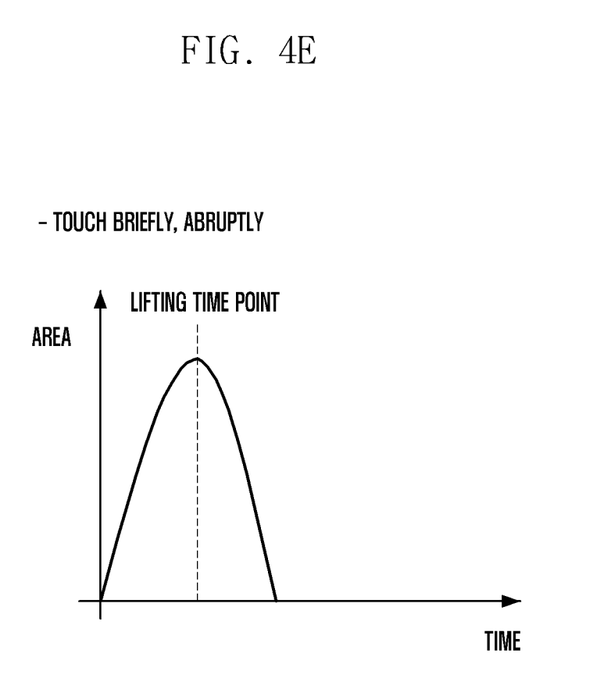

FIG. 4E illustrates a plot showing the rate of change of the touch area when a touch tool briefly and abruptly touches the touch screen 140.

When a user's finger or a touch tool touches the touch screen 140 with a preset magnitude of force or a preset speed, the mobile device 100 detects the rapid increase in the touch area within a certain period of time, as the front part of the plot illustrated in FIG. 4E, and then the rapid decrease in the touch area as the later part of the plot. When the mobile device 100 detects the change in the touch area corresponding to a gesture 'Briefly and abruptly touching,' the mobile device 100 outputs an audio signal or vibration pattern, corresponding to a position where the touch event occurs, as a 'brief and abrupt stroke' is applied to an actual musical instrument. For example, when the user briefly and abruptly touches the effective touch area 14 on the drum image on the touch screen 140 as illustrated in diagram 305 of FIG. 3, the mobile device 100 creates a corresponding touch event and outputs an audio signal, corresponding to the rate of change of the touch area, as if a brief and abrupt stroke is applied to an actual drum.

Although an exemplary embodiment of the present invention has been described in such a way that at least one of the audio signal and the vibration pattern is output according to the rate of change of the touch area when the user touches the drum image displayed on the touch screen 140 as illustrated in diagram 305 of FIG. 3, it should be understood that the invention is not limited thereto.

That is, the mobile device 100 may also output at least one of the audio signal and the vibration pattern according to the rate of change of the touch area when the user touches the piano image displayed on the touch screen 140 as illustrated in diagram 307 of FIG. 3. For example, when the user selects a piano from the 'Play musical instrument' menu as illustrated in diagram 303 of FIG. 3, the mobile device 100 sets the touch panel 143 and displays a piano image as illustrated in diagram 307 of FIG. 3. When the user touches a key of the keyboard of the piano image on the touch screen 140 and creates a touch event, the mobile device 100 detects a location of the touched key from the touch event, the change in the touch area touched by the user, and outputs an audio signal corresponding to the touched key according to the rate of change of the touch area. For example, when the user creates a touch event corresponding to a key 'sol' on the piano keyboard on the touch screen 140, by performing a gesture corresponding to the change in the touch area, as the user briefly and abruptly strokes an actual piano key, the mobile device 100 outputs an audio sound 'sol' as a brief and abrupt stroke is applied to an actual piano key. As such, the mobile device 100 may vary the property of at least one of the audio signal and vibration pattern, according to the rate of change of the touch area, and outputs the varied audio signal and vibration pattern. The mobile device 100 may vary the magnitude of an audio signal, the output duration time of the audio signal, or the tone of the audio signal, according to the rate of change of the touch area, and outputs the varied audio signal. Alternatively, the mobile device 100 may also vary the magnitude of a vibration pattern, the output duration time of the vibration pattern, or the vibration pattern, according to the rate of change of the touch area, and outputs the varied vibration pattern. In addition, the mobile device 100 may also be implemented in such a way that it may simultaneously vary and output the audio signal and the vibration pattern.

In addition, when the user selects a guitar from the 'Play musical instrument' menu as illustrated in diagram 303 of FIG. 3, the mobile device 100 displays a guitar image on the display unit 141, sets the effective touch areas as the respective strings of the guitar, and outputs a guitar sound and a vibration pattern according to a touch event that occurs in a corresponding effective touch area. When a touch event occurs on a string, the mobile device 100 varies the property of an audio sound or a vibration pattern corresponding to the string, according to the rate of change of the touch area, and outputs the varied audio signal and vibration pattern.

Although an exemplary embodiment of the present invention has explained in such a way that the rate of change of the touch area is acquired by detecting all of the changes in the increase of the touch area, the change in the decrease of the touch area, and the retainment of the touch area, it should be understood that the present invention is not limited thereto. That is, the mobile device 100 may detect one of the changes in the increase of the touch area, the change in the decrease of the touch area, and the retainment of the touch area, and varies the property of the function to be performed.

For example, when the mobile device 100 detects a change in the increase of the touch area, if the touch area rapidly increases, compared with a preset value, the mobile device 100 outputs an audio signal larger than a preset value, by varying the property of the audio signal in such a way that the output duration time of the audio signal decreases. When the mobile device 100 detects the change in the increase of the touch area, if the touch area smoothly increases, compared with a preset value, the mobile device 100 outputs an audio signal smaller than a preset value, by varying the property of the audio signal in such a way that the output duration time of the audio signal increases. If the touch area has not been changed since a touch event occurred, the mobile device 100 uses the property of the audio signal so that the audio signal may be output in a preset magnitude.

The application of the audio property may be similar to that of the vibration pattern. That is, when the touch area rapidly increases, compared with a preset value, the mobile device 100 outputs a vibration pattern larger than a preset magnitude, while decreasing the output duration time of the vibration pattern. If the touch area smoothly increases, compared with a preset value, the mobile device 100 outputs a vibration pattern smaller than a preset magnitude, while increasing the output duration time of the audio signal. If the touch area has not changed since a touch event occurred, the mobile device 100 continues outputting a vibration pattern with a preset magnitude.

As described above, the system for operating a mobile device may perform a function corresponding to information regarding a location where a touch event occurs, by varying the property of the function according to the rate of change of the touch area corresponding to the touch event. The mobile device 100 does not simply perform a function by touching the touch area, but performs a function conversion according to the rate of change of the touch area, thereby outputting various types of audio signals and vibration patterns.

A configuration and operation of a system for operating a mobile device according to a rate of change of a touch area. A method for operating a mobile device according to a rate of change of a touch area is described below.

Figure 5:
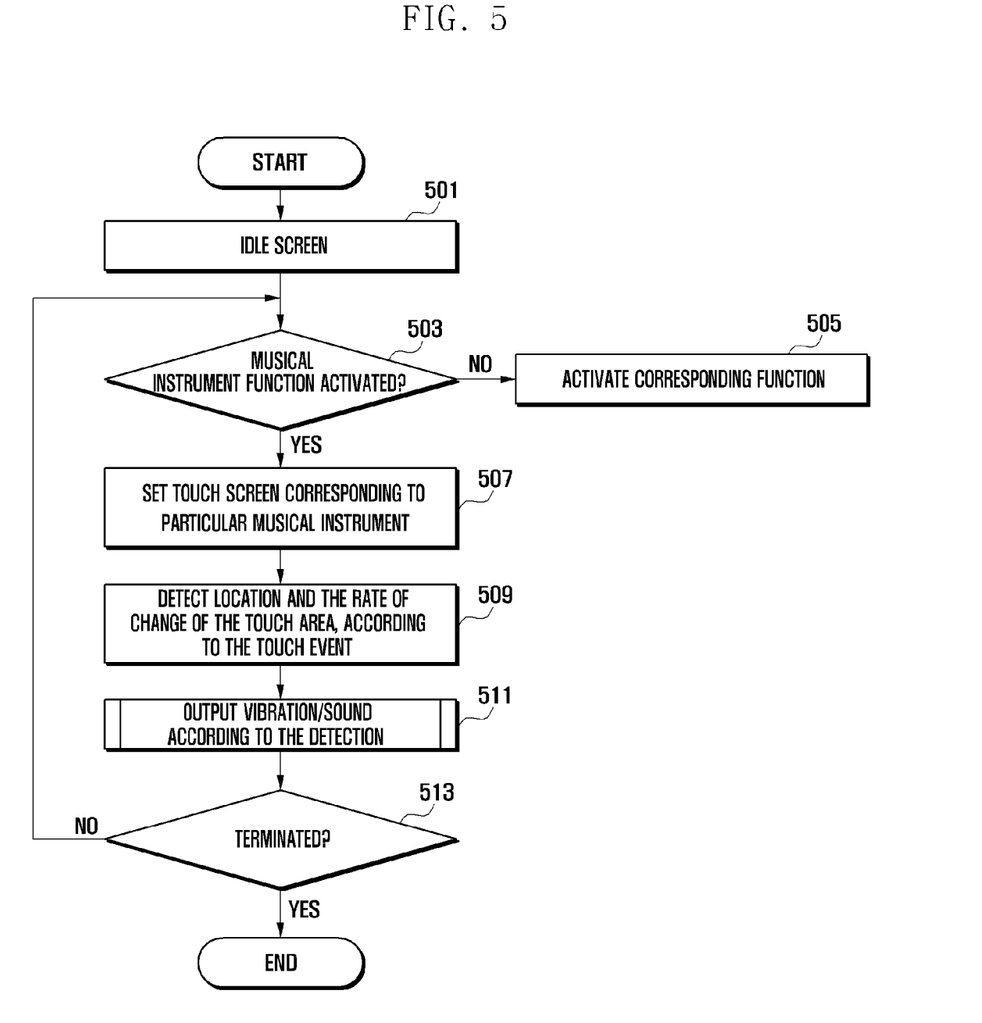
FIG. 5 is a flowchart illustrating a method for operating a mobile device according to a rate of change of a touch area according to an exemplary embodiment of the invention.

FIG. 5 is a flowchart illustrating a method for operating a mobile device according to a rate of change of a touch area according to an exemplary embodiment of the invention.

Referring to FIGS. 1 to 5, the controller 160 completes a booting operation and displays an idle screen, according to preset schedule information in step 501.

The controller 160 determines whether a signal or a touch event is input to activate a musical instrument function, via the input unit 120 or the touch screen 140 in step 503. When the controller 160 determines that a signal or a touch event, input via the input unit 120 or the touch screen 140, is not meant to activate a musical instrument function in step 503, the controller 160 performs a function related to a corresponding signal or touch event in step 505. Examples of the function are a voice call, a file search, a file playback, a web access, and the like.

On the contrary, when the controller 160 determines that a signal or a touch event is input to activate a musical instrument function in step 503, the controller 160 sets the touch screen to allow a user to play a corresponding musical instrument in step 507. That is, the controller 160 controls the display unit 141 to display an image of a user's selected musical instrument and sets the touch panel 143 so that the user may touch an effective touch area in the musical instrument image.

Thereafter, the controller 160 acquires information regarding a location in the effective touch area where a touch event occurs and also the rate of change of the touch area at the location in step 509. The controller 160 outputs an audio signal or a vibration pattern according to the touch location and the rate of change of the touch area in step 511, which will be described in detail below with reference to FIG. 6. Thereafter, the controller 160 determines whether a signal or a touch event for terminating the musical instrument function is input in step 513. When the controller 160 determines that a signal or a touch event for terminating the musical instrument function is not input in step 513, the controller 160 returns to step 503. Otherwise, the controller 160 terminates the procedure of the musical instrument function.

Figure 6:
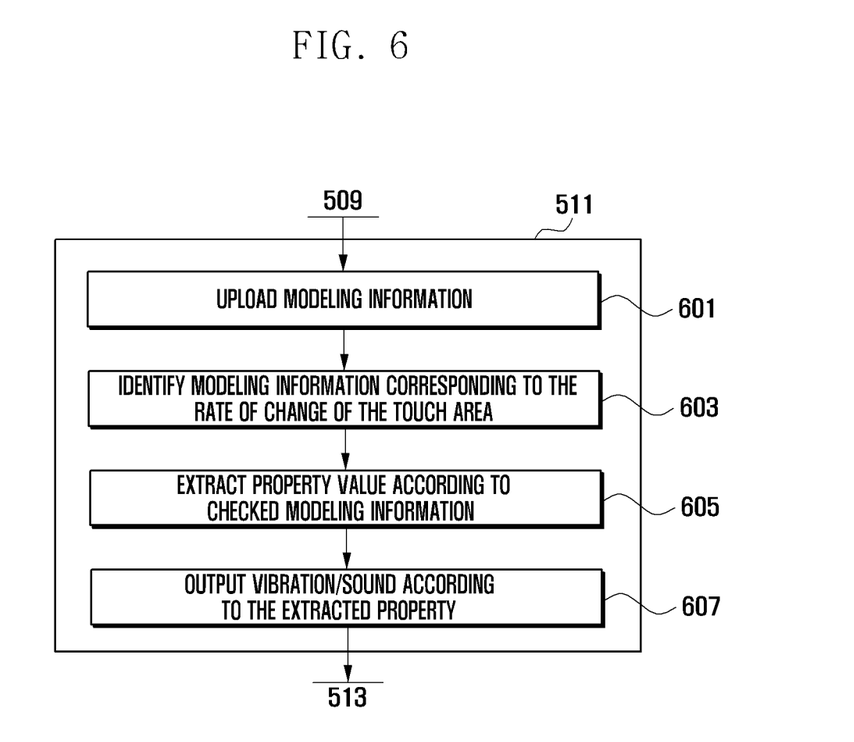
FIG. 6 is a flowchart illustrating an output of an audio signal or a vibration pattern according to a touch location and rate of change of a touch area according to an exemplary embodiment of the invention.

FIG. 6 is a flowchart illustrating an output of an audio signal or a vibration pattern according to a touch location and a rate of change of a touch area according to an exemplary embodiment of the present invention.

Referring to FIGS. 1 to 6, the mobile device 100 uploads modeling information about the rate of change of the touch area from the storage unit 150 in step 601. The modeling information regarding the rate of change of the touch area is modeled on the rate of change of the touch area according to various types of touch events. For example, the modeling information is related to the rate of change in the touch area, created when a touch tool touches the touch screen 140, in various types of touches, 'firm touch,' 'gentle touch,' 'heavy touch,' 'abrupt touch,' and the like, by applying a force or speed with a certain magnitude to the touch screen 140. The user may previously define the modeling information corresponding to the types of touches applied to the touch screen 140, via a setting screen and register the modeling information in the mobile device 100.

The controller 160 identifies the modeling information regarding the rate of change of the touch area that is currently generated on the touch screen 140 in step 603. That is, the controller 160 detects a type of touch event corresponding to the rate of change of the touch area, currently generated on the touch screen 140, from the modeling information.

The controller 160 extracts a property value according to the identified modeling information in step 605. The property value according to the modeling information may be previously defined. That is, during the process of defining the modeling information, when the mobile device 100 acquires touch events corresponding to the modeling information, the property is assigned to the touch events. The property may be determined according to information input by the user. If the user does not input information, the property may be determined at random or according to preset information. The property information includes the change of the magnitude of an audio signal, the change of the output time of an audio signal, the change of the tone of an audio signal, and the like. The property information also includes the change of the magnitude of a vibration pattern, the change of the output time of a vibration pattern, the change of the pattern of a vibration pattern, and the like.

After having extracted the property value corresponding to the modeling information in step 605, the controller 160 applies the extracted property value to at least one of a vibration or an audio signal and then outputs the vibration or the audio signal in step 607. For example, when the controller 160 detects the rate of change of the touch area as illustrated in FIG. 4B and identifies modeling information corresponding to the detected rate of change, the controller 160 increases the magnitude of a vibration or an audio sound to a preset value, according to a property value, and then outputs the vibration or the audio sound. Likewise, when the controller 160 detects the rate of change of the touch area as illustrated in FIG. 4C, the controller 160 decreases the magnitude of a vibration or an audio sound to a preset value, by applying a property value, and then outputs the vibration or the audio sound. When the mobile device 100 performs a function corresponding to a location where a touch event occurs, the mobile device 100 varies the property of a function according to the rate of change of the touch area and performs a function according to the varied property.

The method for operating a mobile device according to the rate of change of the touch area may perform different functions according to the information of locations where touch events occur and the rate of change of the touch area at a corresponding location. Although the exemplary embodiments of the present invention have been described in such a way that that output of the audio signal or the vibration pattern is controlled according to the location where a touch event occurs and the rate of change of the touch area, based on a function of playing a musical instrument, it should be understood that the present invention is not limited thereto. That is, the exemplary embodiments of the present invention may be modified in such a way that, when a touch event occurs on the touch screen 140, a function linked to the location where the touch event occurred may be performed. The property of the function to be performed may be varied according to the rate of change of the touch area. For example, when a game function has a 'billiard' game, the mobile device 100 may allow the user to hit a particular billiard ball as the user creates a touch event serving as a cue. In this case, the speed, direction and method of hitting a billiard ball may be defined differently according to the rate of change of the touch area. That is, when the user creates a touch event corresponding to the rate of change of the touch area as illustrated in FIG. 4D, the mobile device 100 may define the touch event as a 'pushing hitting method.' Likewise, when the user creates a touch event corresponding to the rate of change of the touch area as illustrated in FIG. 4E, the mobile device 100 may define the touch event as a 'downward hitting method.' In addition, the mobile device 100 may variously apply the rate of change of the touch area to the property of a corresponding function. The mobile device 100 may store information in the storage unit 150, where the information defines the properties of respective game functions or user's functions according to the rate of change of the touch area. When a corresponding function is activated, the mobile device 100 allows the controller 160 to load and perform the function.

The mobile device 100 may be operated in such a way that the variation of property of a function according to the rate of change of the touch area may be applied to a mode selection. That is, when the user activates a mode for the variation of property of a function according to the rate of change of the touch area, the mobile device 100 extracts the rate of change of the touch area when a touch event occurs and varies the property of the function according to the rate of change of the touch area. If a mode setting operation is not performed, the mobile device 100 only detects the type of touch event and performs a function corresponding to the touch event. The mobile device 100 provides a menu for the mode settings or a shortcut key for enabling or disenabling a corresponding mode.

Although not illustrated, the mobile device 100 may be configured to selectively further include units having add-on functions such as a short-range communication module for short-range wireless communication; a camera module for capturing still images or moving images, an interface for wireless or wiredly transmitting/receiving data, an Internet communication module for performing communication via the Internet, and a digital broadcast module for receiving and reproducing broadcast. With the development of digital convergence, although a variety of mobile devices is too diverse to list their modifications, it should be understood to those skilled in the art that other units equivalent to the above-listed units may be further included to the mobile device. Also, it will be appreciated that, according to the purposes, the mobile device 100 may be implemented by omitting a particular element or replacing it with other elements.

In addition, although the mobile device according to the exemplary embodiments of the present invention has been explained in such a way that the mobile device detects a rate of change of a touch area and supports a variation of property according to the rate of change, the mobile device may be applied to all types of mobile communication terminals that are operated according to communication protocols corresponding to a variety of communication systems. It should also be understood that the mobile device may be applied to all information communication devices, multimedia devices, and their applications, such as, a Portable Multimedia Player (PMP), a digital broadcast player, a Personal Digital Assistant (PDA), an audio player (e.g., an MP3 player), a portable game device, a smart phone, a laptop computer, a hand-held Personal Computer (PC), and the like.

As described above, a method and system of operating a mobile device according to a rate of change of a touch area allow a user to create a variety of touch events on a touch screen, and allow the mobile device to support various types of applications based on the user's created touch events.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method for operating a mobile device according to a change of a touched area, the method comprising:
    displaying an image item on a display unit;
    setting a particular region of the image item as an effective touch region;
    detecting a touch on the effective touch region;
    detecting a change of a size of contact of the detected touch on the effective touch region within a certain time;
    determining at least one of an audio signal and a vibration pattern according to a location of the detected touch on the effective touch region;
    determining a magnitude and an output time of the at least one of the audio signal and the vibration pattern adjusted according to the detected change of the size of the contact; and
    outputting at least one of the audio signal and the vibration pattern corresponding to the location of the detected touch and the change of the size of the contact, by adjusting the at least one of the audio signal and the vibration pattern based on the determined magnitude and output time,
    wherein the outputting of the at least one of the audio signal and the vibration pattern comprises:
        outputting, when the size of the contact rapidly increases compared with a preset value, the audio signal greater than a preset magnitude, by applying a property to the audio signal so that an output time of the audio signal is short;

outputting, when the size of the contact smoothly increases compared with the preset value, the audio signal less than the preset magnitude, by applying a property to the audio signal so that the output time of the audio signal is long; and outputting, when the size of the contact does not change after the touch event occurs, the audio signal with a same magnitude as the preset magnitude, by applying a property to the audio signal so that the output of the audio signal has the same magnitude as the preset magnitude.

2. The method of claim 1, wherein the detecting of the change of the size of the contact of the detected touch comprises at least one of:
detecting an increase of the size of the contact;
detecting a decrease of the size of the contact; and
detecting a retainment of the size of the contact.

3. The method of claim 1, wherein the outputting of the at least one of the audio signal and the vibration pattern comprises at least one of:
varying and outputting the magnitude of the audio signal according to the change of the size of the contact;
varying and outputting the output time of the audio signal according to the change of the size of the contact; and
varying and outputting a tone of the audio signal according to the change of the size of the contact.

4. The method of claim 1, wherein the outputting of the at least one of the audio signal and the vibration pattern comprises at least one of:
varying and outputting a magnitude of the vibration pattern according to the change of the size of the contact;
varying and outputting an implementing time of the vibration pattern according to the change of the size of the contact; and
varying and outputting a pattern of the vibration pattern according to the change of the size of the contact.

5. The method of claim 4, wherein the outputting of the at least one of the audio signal and the vibration pattern comprises:
outputting, when the size of the contact rapidly increases compared with a preset value, the vibration pattern greater than a preset magnitude, by performing a control operation so that the output time of the vibration pattern is short;
outputting, when the size of the contact smoothly increases compared with a preset value, the vibration pattern smaller than a preset magnitude, by performing a control operation so that the output time of the vibration pattern is long; and
outputting, when the size of the contact does not change after the touch event occurs, the vibration pattern with a same magnitude as a preset magnitude, by performing a control operation so that the output of the vibration pattern has the same magnitude as the preset magnitude.

6. The method of claim 1, further comprising:
defining the variation of a property of a function to be performed according to the change of the size of the contact;
storing data that defines the variation of the property of the function; and
loading the data when an application program for supporting the function is activated.

7. The method of claim 1, further comprising:
comparing information of the detected change of the size of the contact with modeling information according to a plurality of types of touch events; and
determining a type of the touch event according to the comparison.

8. The method of claim 7, wherein the modeling information includes:
information of a firm type touch event comprising a rapid increase in the size of the contact and a rapid decrease in the size of the contact after the rapid increase each within a certain time, with less than a threshold time between an end of the rapid increase and a start of the rapid decrease;
information of a gentle type touch event comprising a gradual increase in the size of the contact with the gradual increase lasting longer than the certain time and a rapid decrease in the size of the contact after the gradual increase within the certain time;
information of a heavy type touch event comprising a rapid increase in the size of the contact within the certain time, a maintaining of the size of the contact after the rapid increase substantially without changing for at least the threshold time, and a rapid decrease in the size of the contact after the maintaining within the certain time; and
information of a brief/abrupt type touch event comprising a rapid increase in the size of the contact and a rapid decrease in the size of the contact after the rapid increase each within another certain time, with substantially no time after the rapid increase and before the rapid decrease,
wherein the another certain time of the brief/abrupt type touch event is less than the certain time of the firm type touch event, and
wherein the certain time, the another certain time, and the threshold time are configured for a range of user touch inputs.

9. A system for operating a mobile device according to a change of a touched area, the system comprising:
a touch screen configured to:
create a touch event according to a touch,
display an image item, and
set a particular region of the image item as an effective touch region;
and
a controller configured to:
detect a touch on the effective touch region,
detect a change of a size of contact of the detected touch on the effective touch region within a certain time,
determine at least one of an audio signal and a vibration pattern according to a location of the detected touch on the effective touch region,
determine a magnitude and an output time of the at least one of the audio signal and the vibration pattern adjusted according to the detected change of the size of the contact, and
control at least one of an audio processing unit and a vibration
generating unit according to the location and the change of the size of contact,
wherein the audio processing unit outputs an audio signal corresponding to the location of the detected touch and the change in the size of the contact based on the determined magnitude and output time and the vibration generating unit outputs a vibration pattern corresponding to the location of the detected touch based on the determined magnitude and time, and wherein the controller is further configured to perform:
outputting, when the size of the contact rapidly increases compared with a preset value, the audio signal greater than a preset magnitude, by applying a property to the audio signal so that an output time of the audio signal is short;
outputting, when the size of the contact smoothly increases compared with the preset value, the audio signal smaller than the preset magnitude, by applying a property to the audio signal so that the output time of the audio signal is long; and
outputting, when the size of the contact does not change after the touch event occurs, the audio signal with a same magnitude as the preset magnitude, by applying a property to the audio signal so that the output of the audio signal has the same magnitude as the preset magnitude.

10. The system of claim 9, wherein the controller detects at least one of an increase of the size of the contact, a decrease of the size of the contact, and a retainment of the size of the contact.

11. The system of claim 9, wherein the controller adjusts and outputs at least one of the magnitude, the output time, and a tone of the audio signal, according to the change of the size of the contact.

12. The system of claim 9, wherein the controller adjusts and outputs at least one of a magnitude, an implementing time, a tone, and a pattern of the vibration pattern, according to the change of the size of the contact.

13. The system of claim 12, wherein the controller performs:
outputting, when the size of the contact rapidly increases compared with a preset value, the vibration pattern greater than a preset magnitude, by performing a control operation so that the output time of the vibration pattern is short;
outputting, when the size of the contact smoothly increases compared with a preset value, the vibration pattern smaller than a preset magnitude, by performing a control operation so that the output time of the vibration pattern is long; and
outputting, when the size of the contact does not change after the touch event occurs, the vibration pattern with a same magnitude as a preset magnitude, by performing a control operation so that the output of the vibration pattern has the same magnitude as the preset magnitude.

14. The system of claim 9, further comprising:
a storage unit for storing data that defines the variation of a property of a function to be performed according to the change of the size of the contact.

15. The system of claim 9, wherein the controller loads the data when an application program for supporting the function is activated.

* * * * *